United States Patent
Weaver et al.

(10) Patent No.: US 10,677,067 B2
(45) Date of Patent: Jun. 9, 2020

(54) AIRFOIL AND METHOD OF ASSEMBLING SAME

(71) Applicant: General Electric Company, Schenectady, NY (US)

(72) Inventors: Scott Andrew Weaver, Ballston Lake, NY (US); Scott Michael Oppenheimer, Schenectady, NY (US); Thomas Robert Raber, East Berne, NY (US); Scott McCulloch, Johnstown, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 869 days.

(21) Appl. No.: 15/279,808

(22) Filed: Sep. 29, 2016

(65) Prior Publication Data
US 2018/0087385 A1    Mar. 29, 2018

(51) Int. Cl.
| F01D 5/14 | (2006.01) |
| B23P 15/04 | (2006.01) |
| B23H 9/10 | (2006.01) |
| B23H 11/00 | (2006.01) |
| F01D 5/20 | (2006.01) |
| F01D 5/18 | (2006.01) |

(52) U.S. Cl.
CPC .............. *F01D 5/147* (2013.01); *B23H 9/10* (2013.01); *B23H 11/00* (2013.01); *B23P 15/04* (2013.01); *F01D 5/20* (2013.01); *F01D 5/18* (2013.01); *F05D 2230/11* (2013.01); *F05D 2230/20* (2013.01); *F05D 2230/237* (2013.01); *F05D 2230/90* (2013.01); *F05D 2240/307* (2013.01); *F05D 2260/36* (2013.01); *F05D 2300/17* (2013.01)

(58) Field of Classification Search
CPC ... F01D 5/147; F01D 5/20; F01D 5/18; B23H 11/00; B23P 15/04; F05D 5/18; F05D 2230/11; F05D 2230/20; F05D 2230/237; F05D 2230/90; F05D 2240/307; F05D 2260/36; F05D 2300/17
See application file for complete search history.

(56) References Cited

U.S. PATENT DOCUMENTS

| 4,010,531 A | 3/1977 | Andersen et al. | |
| 4,411,597 A * | 10/1983 | Koffel | B23P 6/005 416/224 |
| 4,487,550 A * | 12/1984 | Horvath | F01D 5/20 416/92 |
| 4,540,339 A * | 9/1985 | Horvath | F01D 5/20 415/115 |

(Continued)

FOREIGN PATENT DOCUMENTS

WO    2015162795 A1    10/2015

*Primary Examiner* — Aaron R Eastman
(74) *Attorney, Agent, or Firm* — Fletcher Yoder, P.C.

(57) ABSTRACT

A method of assembling an airfoil includes depositing a bonding material on a first end of the tip portion and shaping the bonding material to form a first plurality of features. The first plurality of features correspond to a second plurality of features on a second end of the body portion. The method also includes positioning the first end relative to the second end such that the first plurality of features and the second plurality of features interlock. The method further includes coupling the first end of the tip portion to the second end of the body portion.

19 Claims, 6 Drawing Sheets

(56) References Cited

U.S. PATENT DOCUMENTS

| | | | |
|---|---|---|---|
| 5,264,011 A * | 11/1993 | Brown | B22F 5/04 |
| | | | 29/889.2 |
| 5,822,852 A | 10/1998 | Bewlay et al. | |
| 6,644,035 B1 | 11/2003 | Yamanaka et al. | |
| 6,792,762 B1 | 9/2004 | Yamanaka et al. | |
| 6,908,288 B2 | 6/2005 | Jackson et al. | |
| 6,916,150 B2 * | 7/2005 | Liang | F01D 5/186 |
| | | | 415/115 |
| 6,990,815 B2 | 1/2006 | Yamanaka et al. | |
| 7,556,477 B2 * | 7/2009 | Sherlock | F01D 5/20 |
| | | | 416/224 |
| 7,600,977 B2 | 10/2009 | Shadbolt et al. | |
| 7,845,908 B1 * | 12/2010 | Liang | F01D 5/187 |
| | | | 416/97 R |
| 7,879,203 B2 | 2/2011 | Weaver et al. | |
| 8,091,228 B2 * | 1/2012 | Hiskes | B23P 6/005 |
| | | | 29/889.1 |
| 8,974,180 B2 | 3/2015 | Parolini et al. | |
| 2006/0218788 A1 | 10/2006 | Boulnois et al. | |
| 2007/0258825 A1 * | 11/2007 | Shadbolt | B23P 6/002 |
| | | | 416/223 R |
| 2007/0292273 A1 * | 12/2007 | Downs | F01D 5/20 |
| | | | 416/223 R |
| 2009/0260342 A1 | 10/2009 | Ishiguro et al. | |
| 2015/0352649 A1 | 12/2015 | Bareiss et al. | |

\* cited by examiner

AIRFOIL AND METHOD OF ASSEMBLING SAME

BACKGROUND

The field of the disclosure relates generally to airfoils and, more particularly, to airfoils including a body portion and a tip portion coupled to the body portion.

At least some known airfoils include a tip portion and a body portion. Under at least some operating conditions, the tip portion and the body portion experience different loads. Accordingly, in at least some known airfoils, the tip portion and the body portion are assembled separately and are configured to withstand different loads and different temperatures. For example, in at least some known airfoils, the body portion is formed in an open-tip or tipless casting process and the tip portion is coupled to the body portion after the body portion is formed. However, coupling the tip portion to the body portion requires that the tip portion be precisely aligned on the body portion. For at least some known airfoils, the alignment process requires specialized equipment. For example, to assemble at least some known airfoils, the tip portion is positioned on the body portion and clamped in position. If the tip portion and the body portion are misaligned, the airfoil has an increased risk of failure during its service life.

BRIEF DESCRIPTION

In one aspect, a method of assembling an airfoil is provided. The airfoil includes a tip portion and a body portion. The method includes depositing a bonding material on a first end of the tip portion and shaping the bonding material to form a first plurality of features. The first plurality of features correspond to a second plurality of features on a second end of the body portion. The method also includes positioning the first end relative to the second end such that the first plurality of features and the second plurality of features interlock. The method further includes coupling the first end of the tip portion to the second end of the body portion.

In another aspect, an airfoil is provided. The airfoil includes a tip portion including a first end of the airfoil. The first end includes a bonding material defining a first plurality of features. The airfoil further includes a body portion including a second end configured to couple to the first end. The second end includes a second plurality of features. The first plurality of features correspond to the second plurality of features such that the first plurality of features and the second plurality of features interlock.

In yet another aspect a method of assembling a rotary machine is provided. The method includes depositing a bonding material on a first end of a tip portion and shaping the bonding material to form a first plurality of features. The first plurality of features correspond to a second plurality of features on a second end of a body portion. The method also includes positioning the first end relative to the second end such that the first plurality of features and the second plurality of features interlock. The method further includes coupling the first end of the tip portion to the second end of the body portion such that the tip portion and the body portion form an airfoil. The method also includes coupling the airfoil to a rotor such that the airfoil directs fluid. The airfoil has a pressure side and a suction side. The pressure side and the suction side extend from the body portion to the tip portion.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "fluid" includes any medium or material that flows, including, but not limited to, air.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments described herein provide a method for assembling an airfoil including a tip portion and a body portion. A bonding material is deposited on the tip portion and shaped to include a first plurality of features that correspond to a second plurality of features on the body portion. In some embodiments, the first plurality of features include protuberances that extend into recesses defined by the body portion. The first plurality of features facilitate the tip portion aligning with the body portion when the tip portion is positioned against the body portion. Moreover, the first plurality of features facilitate the tip portion bonding to the body portion during assembly of the airfoil.

Figure 1:
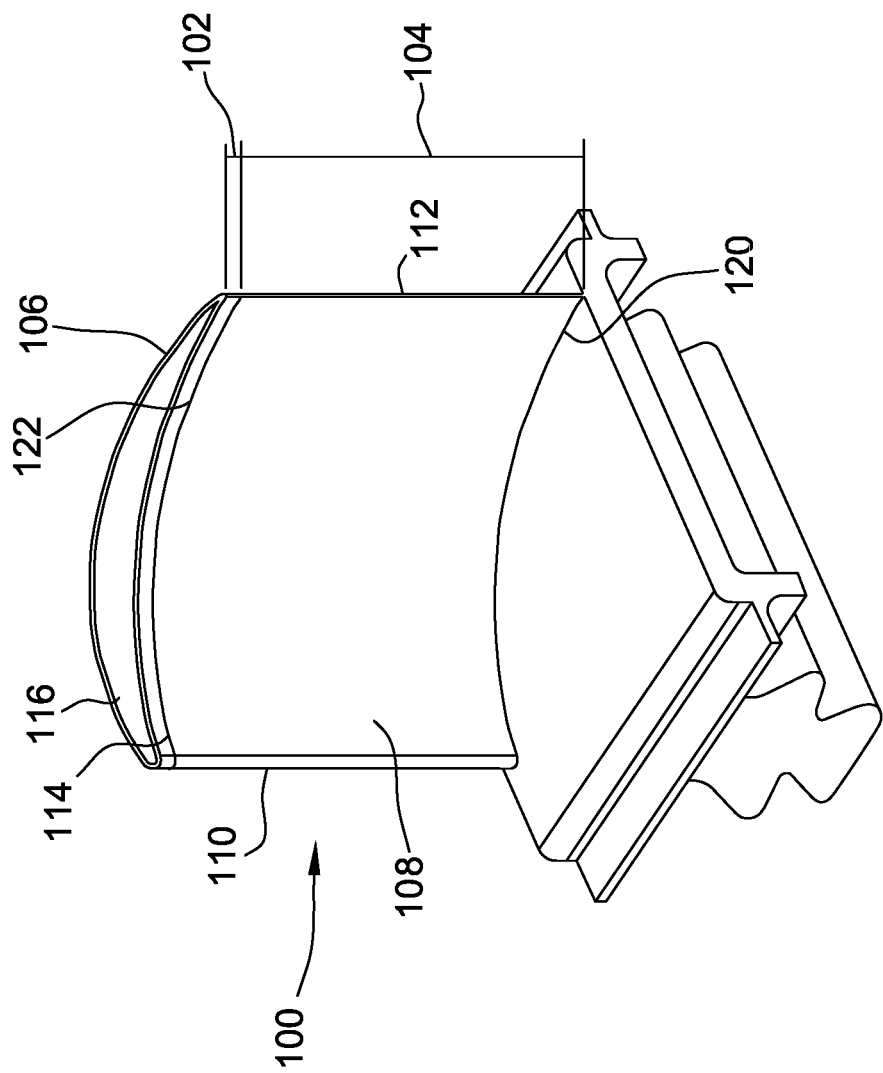
FIG. 1 is a perspective view of an exemplary airfoil including a tip portion and a body portion.
Figure 2:
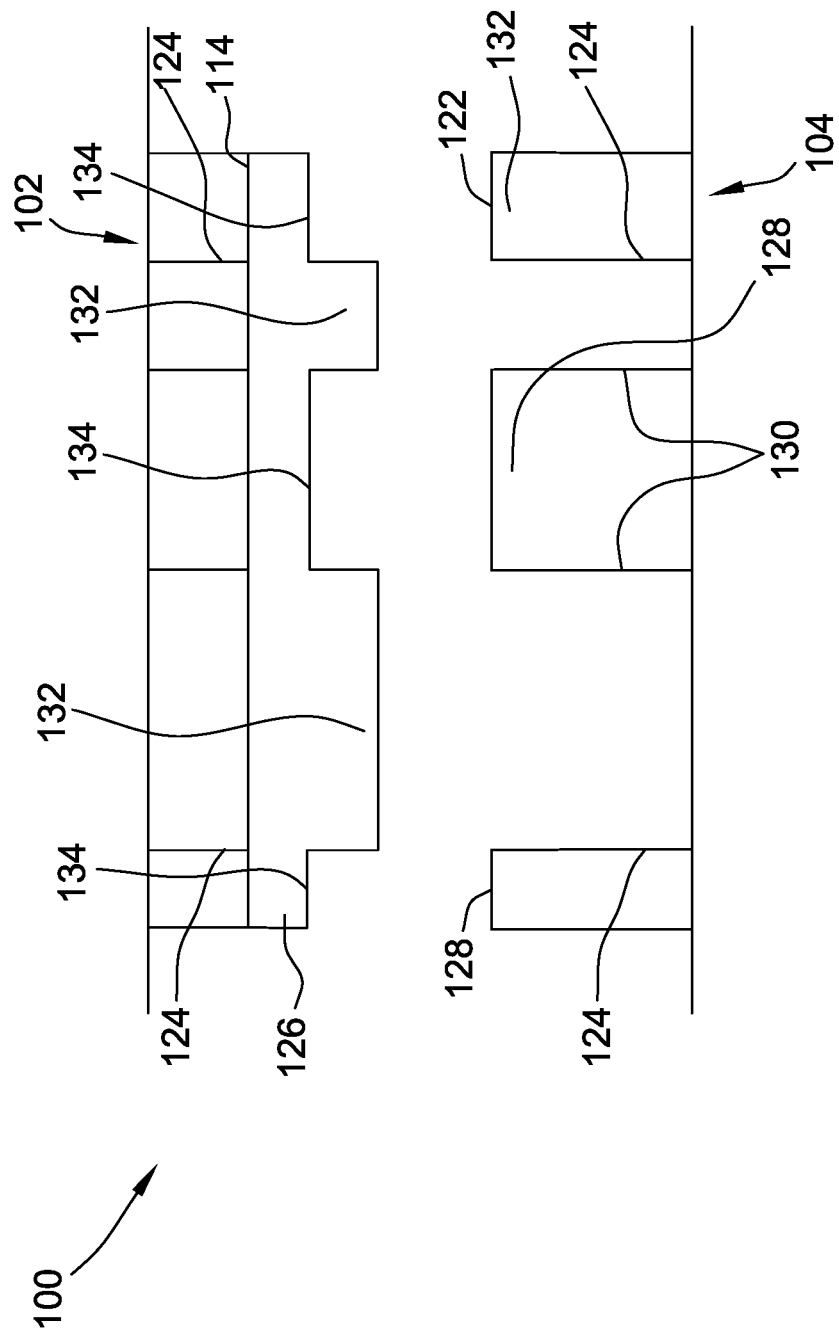
FIG. 2 is a cross-sectional view of a portion of the airfoil shown in FIG. 1 with the tip portion spaced from the body portion.
Figure 3:
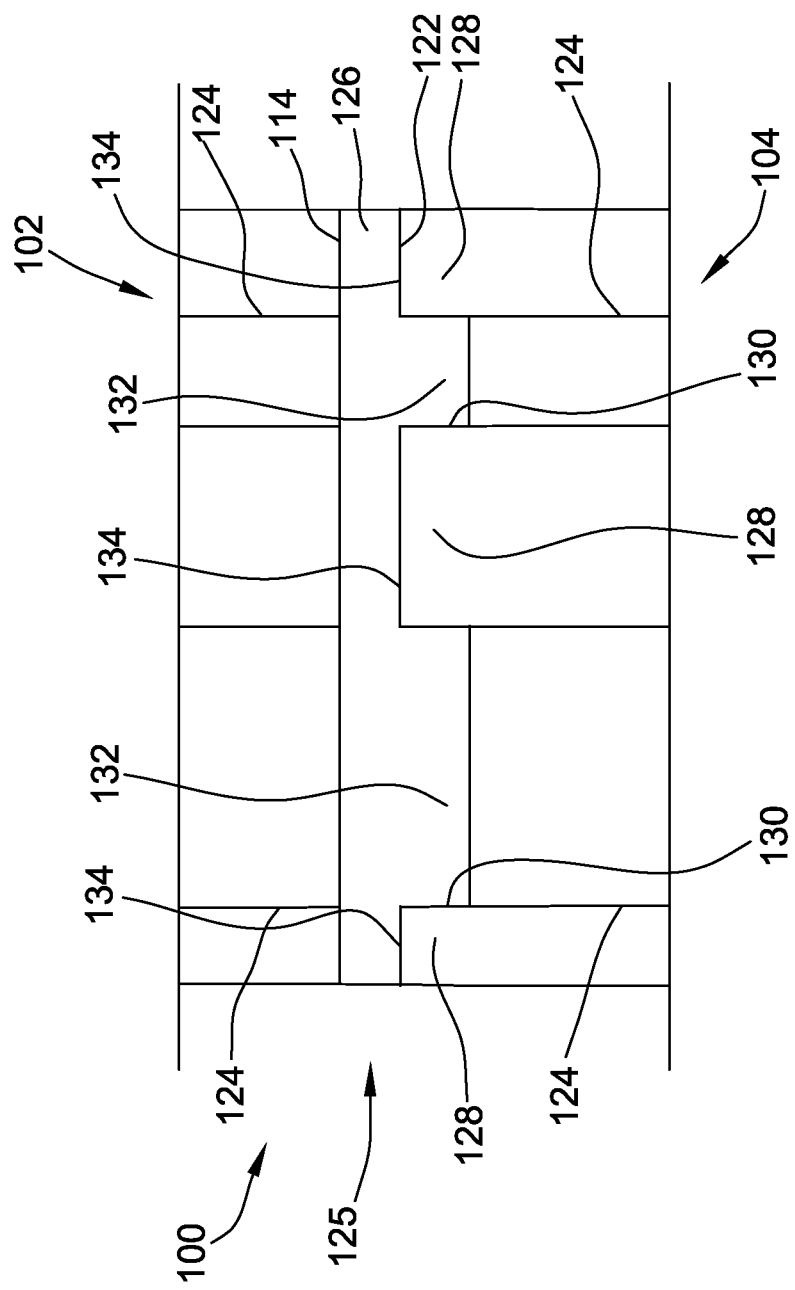
FIG. 3 is a cross-sectional view of a portion of the airfoil shown in FIG. 1 with the tip portion and the body portion interlocked.

FIG. 1 is a perspective view of an exemplary airfoil 100 including a tip portion 102 and a body portion 104. FIG. 2 is a cross-sectional view of a portion of airfoil 100 with tip portion 102 spaced from body portion 104. FIG. 3 is a cross-sectional view of a portion of airfoil 100 with tip portion 102 and body portion 104 interlocked. In the exemplary embodiment, airfoil 100 is a rotor blade for a turbomachine such as a turbine. Examples, of turbine include gas turbine engines, and steam turbines. Airfoil 100 is configured to direct fluid as the turbomachine operates. In alternative embodiments, airfoil 100 is any airfoil. In the exemplary embodiment, airfoil 100 further includes a pressure sidewall 106 and a suction sidewall 108. Pressure sidewall 106 and suction sidewall 108 extend from body portion 104 to tip portion 102. In the exemplary embodiment, pressure sidewall 106 is substantially concave and suction sidewall 108 is substantially convex. Pressure sidewall 106 is coupled to suction sidewall 108 at a leading edge 110 and at a trailing edge 112. In some embodiments, airfoil 100 is coupled to a rotor (not shown) such that trailing edge 112 is downstream from leading edge 110. In alternative embodiments, airfoil 100 has any configuration that enables airfoil 100 to function as described herein.

In the exemplary embodiment, tip portion 102 includes a first end 114, a second end 116, and cooling passages 124. Second end 116 is opposite first end 114. In alternative embodiments, airfoil 100 includes any tip portion 102 that enables airfoil 100 to operate as described herein.

Also, in the exemplary embodiment, body portion 104 includes a first end 120, a second end 122, and a plurality of cooling passages 124. Second end 122 is opposite first end 120. Cooling passages 124 facilitate fluid flowing through airfoil 100 to regulate the temperature of airfoil 100. As described below, body portion 104 is configured to align with tip portion 102 such that cooling passages 124 in body portion 104 align with cooling passages 124 in tip portion 102 and cooling passages 124 extend continuously through at least a portion of airfoil 100. In alternative embodiments, airfoil 100 includes any body portion 104 that enables airfoil 100 to operate as described herein.

In addition, in the exemplary embodiment, second end 122 of body portion 104 contacts first end 114 of tip portion 102. Body portion 104 and tip portion 102 are aligned such that pressure sidewall 106 and suction sidewall 108 extend continuously from first end 120 of body portion 104 to second end 116 of tip portion 102. Second end 122 is bonded to first end 114 such that body portion 104 and tip portion 102 form airfoil 100. In alternative embodiments, tip portion 102 and body portion 104 are coupled together in any manner that enables airfoil 100 to operate as described herein.

In reference to FIG. 3, in the exemplary embodiment, tip portion 102 and body portion 104 are bonded together at a joint 125. During assembly of airfoil 100 and prior to bonding of tip portion 102 and body portion 104, a bonding material 126 is positioned between first end 114 and second end 122. In the exemplary embodiment, bonding material 126 is configured to at least partially bond tip portion 102 and body portion 104. In particular, during assembly of airfoil 100, bonding material 126 is heated above a specified bonding temperature and at least partially bonds to each of tip portion 102 and body portion 104. In the exemplary embodiment, bonding material 126 has a melting point that is lower than the melting points of tip portion 102 and body portion 104. Accordingly, in some embodiments, bonding material 126 is heated to a temperature above the melting pointing of bonding material 126 and below the melting point of tip portion 102 and/or body portion 104. In further embodiments, bonding material 126 is configured to remain at least partially in a solid state and bond tip portion 102 and body portion 104 together. Accordingly, in some embodiments, bonding material 126 is not heated to a temperature above the melting point of bonding material 126. In alternative embodiments, tip portion 102 and body portion 104 are bonded together in any manner that enables airfoil 100 (shown in FIG. 1) to operate as described herein. For example, in some embodiments, tip portion 102 and body portion 104 are bonded together using, without limitation, any of the following processes: cathodic arc deposition, electron beam physical vapor deposition, sputtering, evaporation, magnetronic processes, cold spraying, thermal spraying, and laser ablated deposition. In further embodiments, bonding material 126 is omitted.

In the exemplary embodiment, bonding material 126 includes a composition of a nickel alloy and boron. In alternative embodiments, bonding material 126 includes any material that enables airfoil 100 to operate as described herein. For example, in some embodiments, bonding material 126 includes an alloy having characteristics similar to tip portion 102 and/or body portion 104. In further embodiments, bonding material 126 includes a composition of a structural alloy and a melting point depressant. Examples of structural alloys include, without limitation, any of the following: an iron alloy, a nickel alloy, and a cobalt alloy. Examples of melting point depressants include, without limitation, any of the following: boron and silicon.

Also, in the exemplary embodiment, bonding material 126 is deposited throughout the entirety of first end 114. In alternative embodiments, bonding material 126 is deposited on any portion of first end 114 and/or second end 122 that enables bonding material 126 to function as described herein. For example, in some embodiments, portions of first end 114 adjacent cooling passages 124 are free of bonding material 126.

In some embodiments, bonding material 126 has a maximum thickness in a range of about 2 mil (0.05 millimeters (mm)) to about 10 mil (0.25 mm) prior to shaping. In alternative embodiments, bonding material 126 has any thickness that enables airfoil 100 to operate as described herein.

In addition, in the exemplary embodiment, first end 114 is substantially even, i.e., first end 114 is flat and smooth, to facilitate deposition of bonding material 126 on first end 114. In some embodiments, first end 114 is smoothed and/or flattened after formation of tip portion 102. In alternative embodiments, tip portion 102 includes any first end 114 that enables airfoil 100 to operate as described herein. For example, in some embodiments, first end 114 is uneven.

Also, in the exemplary embodiment, second end 122 includes a plurality of features. The plurality of features include protuberances 128 and recesses 130. At least some recesses 130 form portions of cooling passages 124. Protuberances 128 and recesses 130 are formed during any stage of assembly of body portion 104. For example, in some embodiments, protuberances 128 and recesses 130 are formed during an open-tipped casting process of body portion 104. Imperfections and/or variations during the assembly process result in different protuberances 128 and recesses 130. Moreover, at least some features of body portion 104 are designed to correspond with different properties of airfoils 100. As a result, each body portion 104 has a unique second end 122, similar to a fingerprint. In alternative embodiments, body portion 104 includes any second end 122 that enables body portion 104 to operate as described herein.

To facilitate alignment and bonding of tip portion 102 and body portion 104, bonding material 126 is shaped to correspond to second end 122. In particular, bonding material 126 includes protuberances 132 and recesses 134. Bonding material 126 is configured to align with second end 122 such that protuberances 132 are opposite recesses 130 and recesses 134 are opposite protuberances 128. Accordingly, bonding material 126 and first end 114 form the mirror image of second end 122. As a result, first end 114 precisely aligns with second end 122 to facilitate proper bonding between tip portion 102 and body portion 104. Moreover, bonding material 126 increases bonding surface area between tip portion 102 and body portion 104. In alternative embodiments, bonding material 126 includes any feature that enables airfoil 100 to operate as described herein. For example, in some embodiments, bonding material 126 includes curved surfaces that correspond to surfaces of tip portion 102 and/or body portion 104 and bonding material 126 does not necessarily include protuberances 132 and recesses 130.

Figure 4:
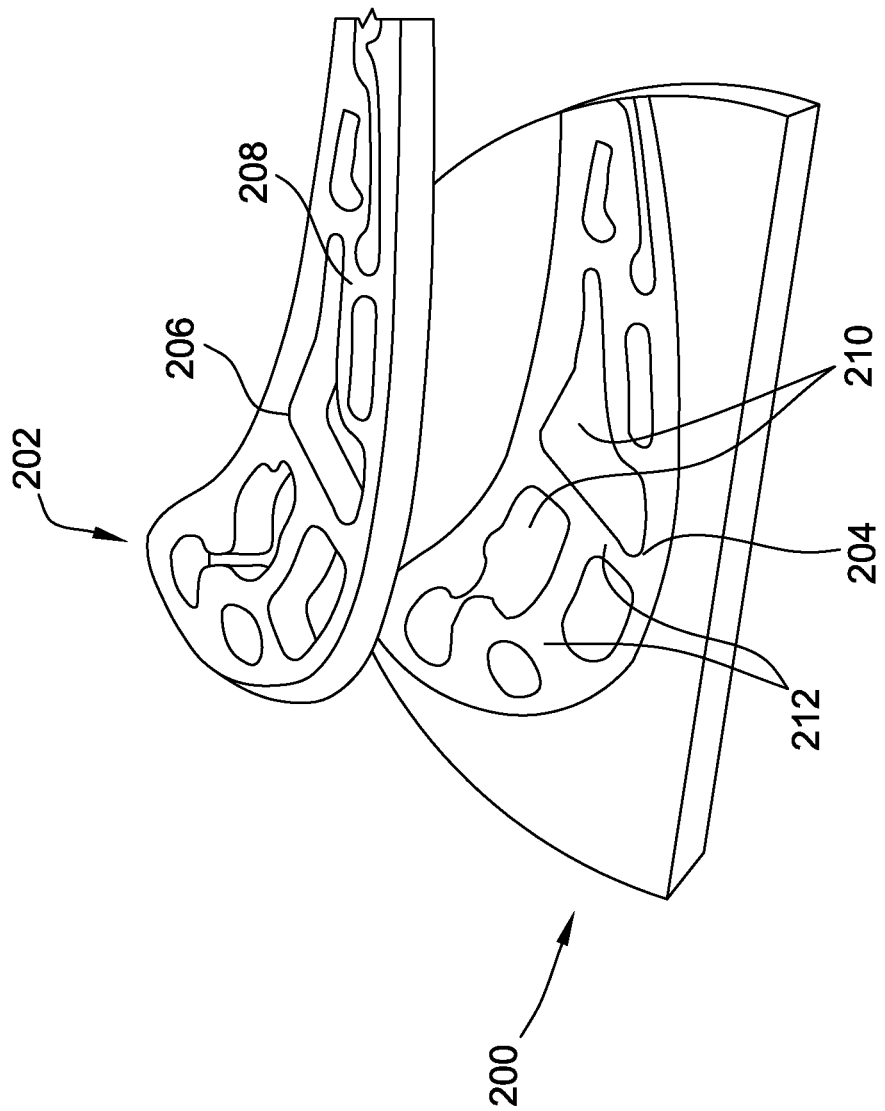
FIG. 4 is a perspective view of an exemplary bonding material that has been shaped using a mask for use in bonding the tip portion and the body portion shown in FIG. 1.

FIG. 4 is a perspective view of a bonding material 200 that has been shaped using a mask 202 for use in bonding tip portion 102 (shown in FIG. 1) and body portion 104 (shown in FIG. 1). Mask 202 is configured to inhibit adherence of bonding material 200 to at least a portion of a substrate 204 when mask 202 is positioned over substrate 204. In some embodiments, substrate 204 is a surface of airfoil 100 (shown in FIG. 1). In alternative embodiments, substrate 302 is any surface that enables bonding material 200 to function as described herein.

In the exemplary embodiment, mask 202 includes open portions 206 and obstructed portions 208. Mask 202 is positioned over substrate 204 prior to deposition of bonding material 200. Bonding material 200 is deposited on substrate 204 over mask 202. Open portions 206 allow bonding material 200 to collect on and/or adhere to substrate 204. Obstructed portions 208 inhibit bonding material 200 collecting on and/or adhering to substrate 204. Accordingly, mask 202 shapes bonding material 200 into a plurality of protuberances 210 and recesses 212. In the exemplary embodiment, mask 202 is a mechanical mask. In alternative embodiments, bonding material 200 is shaped using any mask 202 that enables bonding material 200 to function as described herein. For example, in some embodiments, mask 202 is a chemical mask and includes a chemical that inhibits bonding material 200 adhering to portions of substrate 204.

Figure 5:
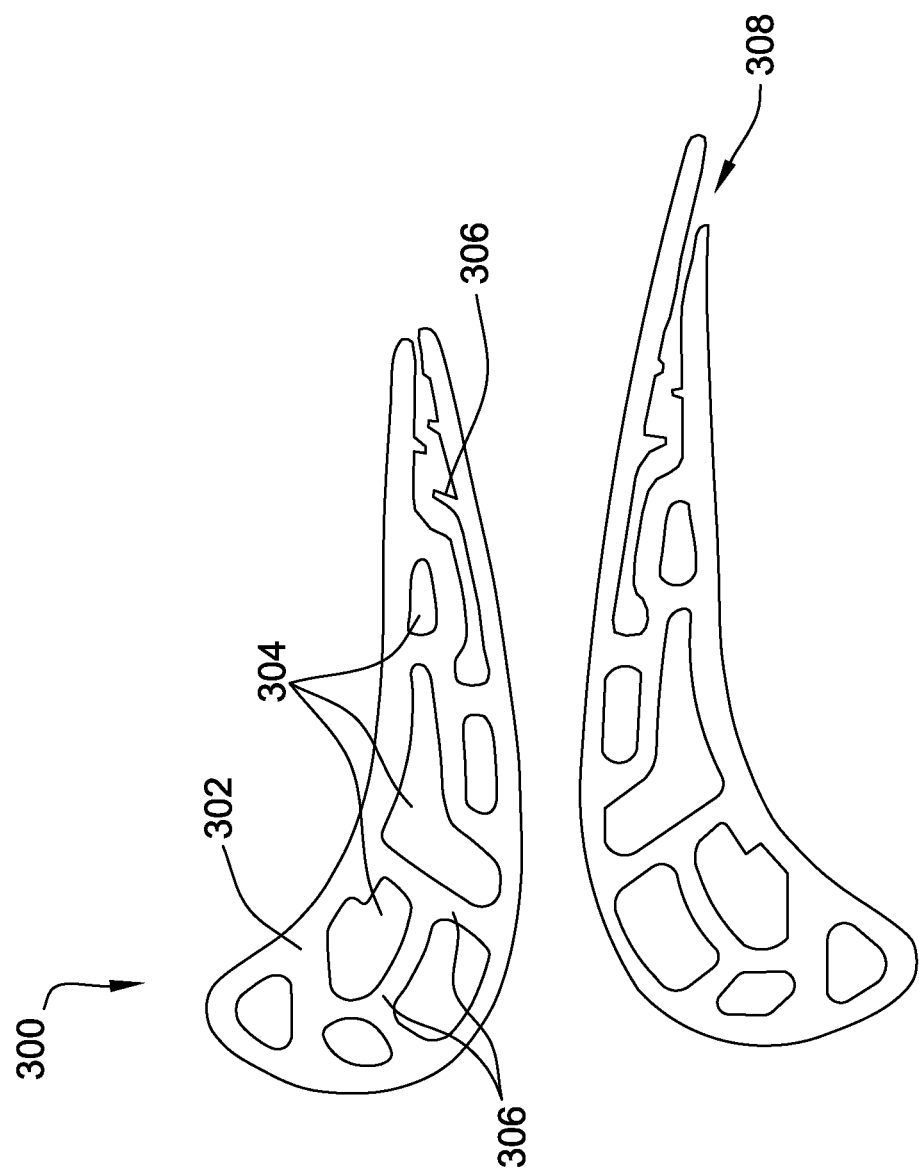
FIG. 5 is a perspective view of an exemplary bonding material that has been shaped for use in bonding the tip portion and the body portion shown in FIG. 1.

FIG. 5 is a perspective view of a bonding material 300 that has been shaped for use in bonding tip portion 102 (shown in FIG. 1) and body portion 104 (shown in FIG. 1). Bonding material 300 is shaped in any manner that enables bonding material 300 to function as described herein. For example, in some embodiments, bonding material 300 is shaped using an electrical discharge machining (EDM) process. In further embodiments, bonding material 300 is shaped using an electrochemical machining (ECM) process.

In the exemplary embodiment, bonding material 300 is positioned on a substrate 302 and includes protuberances 304 and recesses 306. Prior to shaping, bonding material 300 is deposited substantially evenly across substrate 302 and is substantially free of protuberances 304 and recesses 306. In some embodiments, substrate 302 is a surface of airfoil 100 (shown in FIG. 1). In alternative embodiments, bonding material 300 is deposited on any substrate 302 that enables bonding material 300 to function as described herein.

Also, in the exemplary embodiment, a tool 308 is used to shape bonding material 300 on substrate 302. Tool 308 is moved towards and/or through bonding material 300 to shape bonding material 300. In some embodiments, tool 308 is a portion of airfoil 100 (shown in FIG. 1), such as tip portion 102 (shown in FIG. 1) or body portion 104 (shown in FIG. 1). By using a portion of airfoil 100 (shown in FIG. 1) as tool 308, the cost to shape bonding material 300 is reduced. In particular, the need for a separate component to use as tool 308 is eliminated. Moreover, using a portion of airfoil 100 (shown in FIG. 1) provides a more direct and precise manner to shape bonding material 300. In alternative embodiments, bonding material 300 is shaped using any tool 308 that enables bonding material 300 to function as described herein.

In some embodiments, during the EDM process, a source of electrical current is coupled to tool 308 and/or bonding material 300 and electrical current is directed through tool 308 and/or bonding material 300. Each of tool 308 and bonding material 300 acts as an electrode during the EDM process. A difference in electrical potential between the two electrodes causes electric current to flow between the two electrodes, i.e. between bonding material 300 and tool 308. As a result, electrons are removed from at least one of the electrodes. In the exemplary embodiment, electrons are removed from bonding material 300. In some embodiments, tool 308 and substrate 302 are moved closer together as current flows between tool 308 and bonding material 300. As electrons are removed from bonding material 300, portions of bonding material 300 break down and erode. In particular, portions of bonding material 300 adjacent tool 308 break down and erode. As a result, tool 308 shapes or cuts bonding material 300 to form features that correspond to features of tool 308. In some embodiments, a dielectric material is positioned between the two electrodes. The dielectric material is periodically flushed to remove debris from bonding material 300. In further embodiments, the dielectric material facilitates the transfer of electrons. After shaping, bonding material 300 has an embossed surface that forms protuberances 304 and recesses 306. In some embodiments, at least some of substrate 302 is shaped using tool 308.

In some embodiments, during the ECM process, a source of electrical current is coupled to tool 308 and/or bonding material 300 and electrical current is directed through tool 308 and/or bonding material 300. For example, in some embodiments, tool 308 acts as an electrode and bonding material 300 acts as a conductive workpiece during the ECM process. A conductive fluid, i.e., an electrolyte, is directed between the electrode and the conductive workpiece, i.e. between bonding material 300 and tool 308, and tool 308 is moved towards substrate 302. As tool 308 moves towards and through bonding material 300, portions of bonding material 300 break down and erode. In particular, portions of bonding material 300 adjacent tool 308 break down and erode. As a result, tool 308 shapes or cuts bonding material 300 to form features that correspond to features of tool 308. The conductive fluid removes materials from between bonding material 300 and tool 308 during the ECM process. In some embodiments, the conductive fluid is continuously injected between bonding material 300 and tool 308 at a desired rate throughout the ECM process. After shaping, bonding material 300 has an embossed surface that forms protuberances 304 and recesses 306. In some embodiments, at least some of substrate 302 is shaped using tool 308.

In reference to FIGS. 1 and 5, in some embodiments, tip portion 102 and/or body portion 104 is used as tool 308 during the shaping process. For example, in some embodiments, a source of electrical current is coupled to body portion 104 and body portion 104 is used to shape tip portion 102. In further embodiments, a source of electrical current is coupled to tip portion 102 and tip portion 102 is used to shape body portion 104. In some embodiments, tip portion 102 and/or body portion 104 are used as tool 308 during a shaping process including an ECM and/or EDM process. In alternative embodiments, tip portion 102 and/or body portion 104 are shaped in any manner that enables airfoil 100 to function as described herein.

Figure 6:
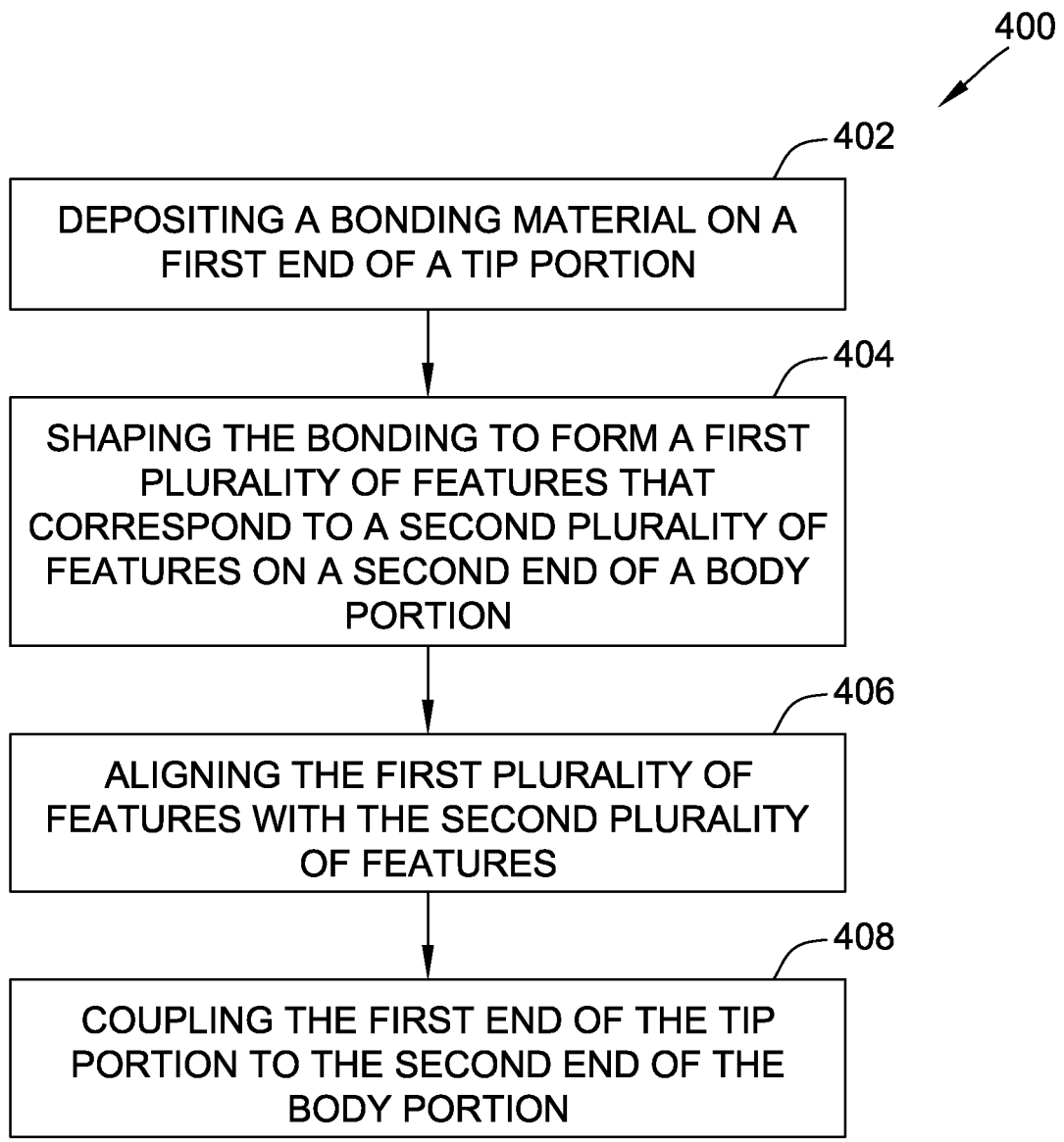
FIG. 6 is a flow chart of an exemplary method of assembling the airfoil shown in FIG. 1.

FIG. 6 is a flow chart of a method 400 of assembling airfoil 100 (shown in FIG. 1). Referring to FIGS. 1-3 and 6, method 400 generally includes depositing 402 bonding material 126 on first end 114 of tip portion 102, shaping 404 bonding material 126 to form a first plurality of features 128, 130, aligning 406 the first plurality of features 128, 130 with a second plurality of features 132, 134 on second end 122 of body portion 104, and coupling 408 first end 114 of tip portion 102 to second end 122 of body portion 104.

In some embodiments, method 400 includes preparing and/or cleaning a surface of airfoil 100. For example, in some embodiments, excess material is removed from tip portion 102 and/or body portion 104 prior to and/or after shaping features 132, 134. In further embodiments, material, such as a thin layer of bonding material 126, is removed from cooling passages 124 after tip portion 102 and body portion 104 are bonded to facilitate air flowing through cooling passages 124.

In the exemplary embodiment, depositing 402 bonding material 126 on first end 114 includes a cathodic arc deposition process and/or any other deposition process. In alternative embodiments, bonding material 126 is deposited on tip portion 102 and/or body portion 104 in any manner that enables bonding material 126 to function as described herein. For example, in some embodiments, bonding material 126 is deposited using, without limitation, any of the following processes: cathodic arc deposition, electron beam physical vapor deposition, sputtering, evaporation, magnetronic processes, cold spraying, thermal spraying, and laser ablated deposition.

Also, in the exemplary embodiment, shaping 404 bonding material 126 includes, without limitation, any of the following processes: electrical discharge machining (EDM), electrochemical machining (ECM), mechanical shaping, chemical shaping, and laser machining. In alternative embodiments, bonding material 126 is shaped in any manner that enables bonding material 126 to function as described herein.

In addition, in the exemplary embodiment, aligning 406 features 128, 130 with features 132, 134 includes moving first end 114 and second end 122 relative to each other until protuberances 132 extend into recesses 130. Protuberances 132 fit into recesses 130 such that features 128, 130 and features 132, 134 interlock when first end 114 and second end 122 are aligned. As a result, tip portion 102 and body portion 104 are self-aligning, which reduces the time and cost required to assemble airfoil 100. Moreover, tip portion 102 and body portion 104 precisely align to allow for a better bond between tip portion 102 and body portion 104. In alternative embodiments, tip portion 102 and body portion 104 are aligned in any manner that enables airfoil 100 to operate as described herein.

The above described embodiments provide a method for assembling an airfoil including a tip portion and a body portion. A bonding material is deposited on the tip portion and shaped to include a first plurality of features that correspond to a second plurality of features on the body portion. In some embodiments, the first plurality of features include protuberances that extend into recesses defined by the body portion. The first plurality of features facilitate the tip portion aligning with the body portion when the tip portion is positioned against the body portion. Moreover, the first plurality of features facilitate the tip portion bonding to the body portion during assembly of the airfoil.

An exemplary technical effect of the methods, systems, and apparatus described herein includes at least one of the following: (a) decreasing time and cost required to assemble airfoils; (b) providing an airfoil tip portion that couples to an airfoil body portion; (c) providing an airfoil body portion and a airfoil tip portion that self-align; (d) reducing the risk of bond failures of airfoils; (e) providing a bond between a tip portion and a body portion that have different properties; and (f) facilitating open tip casting of an airfoil body portion.

Exemplary embodiments of methods, systems, and apparatus described above are not limited to the specific embodiments described herein, but rather, components of systems and/or steps of the methods may be utilized independently and separately from other components and/or steps described herein. Further, the methods, systems, and apparatus may also be used in combination with other systems requiring bonding two surfaces, and the associated methods are not limited to practice with only the systems and methods described herein. Rather, the exemplary embodiment can be implemented and utilized in connection with many other applications, equipment, and systems that may benefit from bonding two surfaces.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an airfoil, the airfoil including a tip portion and a body portion, the method comprising:
   depositing a bonding material on a first end of the tip portion;
   directing electric current through at least one of the tip portion or the body portion to facilitate shaping the bonding material to form a first plurality of features, wherein the first plurality of features correspond to a second plurality of features on a second end of the body portion;
   positioning the first end relative to the second end such that the first plurality of features and the second plurality of features interlock; and
   coupling the first end of the tip portion to the second end of the body portion.

2. The method in accordance with claim 1, wherein shaping the bonding material to form the first plurality of features comprises forming at least one protuberance, the second plurality of features including at least one recess that is configured to receive the at least one protuberance.

3. The method in accordance with claim 2, wherein positioning the first end relative to the second end such that the first plurality of features and the second plurality of features interlock comprises positioning the first end relative to the second end such that the at least one protuberance extends into the at least one recess.

4. The method in accordance with claim 1, wherein shaping the bonding material to form the first plurality of features comprises shaping the bonding material using at least one of an electrochemical machining process or an electrical discharge machining process.

5. The method in accordance with claim 1 further comprising positioning a mask on the first end prior to depositing the bonding material on the first end.

6. The method in accordance with claim 5, wherein positioning the mask on the first end comprises positioning at least one of a chemical mask or a mechanical mask on the first end.

7. The method in accordance with claim 5, wherein depositing the bonding material on the first end of the tip portion comprises depositing the bonding material over the mask, the bonding material contacting the first end through open portions of the mask.

8. The method in accordance with claim 1, wherein depositing the bonding material on the first end of the tip portion comprises using a process including at least one of the following: cathodic arc deposition, electron beam physical vapor deposition, sputtering, evaporation, magnetronic processes, cold spraying, thermal spraying, or laser ablated deposition.

9. The method in accordance with claim 1, wherein shaping the bonding material to form the first plurality of features comprises shaping the bonding material to form the first plurality of features such the first end is configured to align with the second end.

10. The method in accordance with claim 1 further comprising heating the bonding material above a specified temperature, wherein the specified temperature is less than a melting point of at least one of the tip portion or the body portion.

11. The method in accordance with claim 1, wherein depositing the bonding material on the first end of the tip portion comprises using at least one of the following as the bonding material: nickel or boron.

12. A method of assembling an airfoil, the airfoil including a tip portion and a body portion, the method comprising:
depositing a bonding material on a first end of the tip portion;
shaping the bonding material to form a first plurality of features, wherein the first plurality of features correspond to a second plurality of features on a second end of the body portion, and wherein shaping the bonding material to form the first plurality of features comprises shaping the bonding material using at least one of an electrochemical machining process or an electrical discharge machining process;
positioning the first end relative to the second end such that the first plurality of features and the second plurality of features interlock; and
coupling the first end of the tip portion to the second end of the body portion.

13. The method of claim 12, wherein shaping the bonding material to form the first plurality of features comprises forming at least one protuberance, the second plurality of features including at least one recess that is configured to receive the at least one protuberance.

14. A method of assembling an airfoil, the airfoil including a tip portion and a body portion, the method comprising:
positioning a mask on a first end of the tip portion prior to depositing a bonding material on the first end;
depositing the bonding material on the first end;
shaping the bonding material to form a first plurality of features, wherein the first plurality of features correspond to a second plurality of features on a second end of the body portion;
positioning the first end relative to the second end such that the first plurality of features and the second plurality of features interlock; and
coupling the first end of the tip portion to the second end of the body portion.

15. The method of claim 14, wherein shaping the bonding material to form the first plurality of features comprises forming at least one protuberance, the second plurality of features including at least one recess that is configured to receive the at least one protuberance.

16. A method of assembling an airfoil, the airfoil including a tip portion and a body portion, the method comprising:
depositing a bonding material on a first end of the tip portion, wherein depositing the bonding material on the first end of the tip portion comprises using a process including at least one of the following: cathodic arc deposition, electron beam physical vapor deposition, sputtering, evaporation, magnetronic processes, cold spraying, thermal spraying, or laser ablated deposition;
shaping the bonding material to form a first plurality of features, wherein the first plurality of features correspond to a second plurality of features on a second end of the body portion;
positioning the first end relative to the second end such that the first plurality of features and the second plurality of features interlock; and
coupling the first end of the tip portion to the second end of the body portion.

17. The method of claim 16, wherein shaping the bonding material to form the first plurality of features comprises forming at least one protuberance, the second plurality of features including at least one recess that is configured to receive the at least one protuberance.

18. A method of assembling an airfoil, the airfoil including a tip portion and a body portion, the method comprising:
depositing a bonding material on a first end of the tip portion, wherein depositing the bonding material on the first end of the tip portion comprises using at least one of the following as the bonding material: nickel or boron;
shaping the bonding material to form a first plurality of features, wherein the first plurality of features correspond to a second plurality of features on a second end of the body portion;
positioning the first end relative to the second end such that the first plurality of features and the second plurality of features interlock; and
coupling the first end of the tip portion to the second end of the body portion.

19. The method of claim 18, wherein shaping the bonding material to form the first plurality of features comprises forming at least one protuberance, the second plurality of features including at least one recess that is configured to receive the at least one protuberance.

\* \* \* \* \*